(12) United States Patent
Brid

(10) Patent No.: US 9,372,612 B2
(45) Date of Patent: Jun. 21, 2016

(54) EXPOSING INERTIAL SNAP POINTS

(75) Inventor: Regis L. F. Brid, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1177 days.

(21) Appl. No.: 13/286,023

(22) Filed: Oct. 31, 2011

(65) Prior Publication Data

US 2013/0111396 A1     May 2, 2013

(51) Int. Cl.
*G06F 3/0485*     (2013.01)
*G06F 17/21*     (2006.01)

(52) U.S. Cl.
CPC .......... *G06F 3/0485* (2013.01); *G06F 3/04855* (2013.01); *G06F 17/217* (2013.01); *Y10S 715/973* (2013.01); *Y10S 715/974* (2013.01)

(58) Field of Classification Search
CPC . G06F 3/0485; G06F 3/04855; G06F 17/217; H04N 5/44543; H04N 5/44547; H04N 5/44556; H04N 5/44573; Y10S 715/973–715/974; G09G 5/34
See application file for complete search history.

(56) References Cited

U.S. PATENT DOCUMENTS

| | | | | |
|---|---|---|---|---|
| 5,075,673 A * | 12/1991 | Yanker | ........................... | 345/163 |
| 5,359,703 A * | 10/1994 | Robertson | ........... | G06F 3/04815 |
| | | | | 345/419 |
| 5,374,942 A * | 12/1994 | Gilligan et al. | ............... | 345/157 |
| 5,615,384 A | 3/1997 | Allard et al. | | |
| 5,808,601 A * | 9/1998 | Leah | ................... | G06F 3/04812 |
| | | | | 345/157 |
| 5,872,566 A * | 2/1999 | Bates et al. | .................... | 715/786 |
| 5,903,267 A * | 5/1999 | Fisher | ........................... | 715/786 |
| 6,141,018 A * | 10/2000 | Beri et al. | ...................... | 345/473 |
| 6,154,205 A * | 11/2000 | Carroll et al. | ................. | 345/684 |
| 6,157,381 A * | 12/2000 | Bates et al. | .................... | 715/786 |
| 6,208,343 B1 * | 3/2001 | Roth | ............................. | 715/786 |
| 6,856,326 B1 * | 2/2005 | Zhai | .............................. | 345/684 |
| 6,906,697 B2 * | 6/2005 | Rosenberg | .......... | G06F 3/03543 |
| | | | | 345/156 |
| 6,972,776 B2 * | 12/2005 | Davis et al. | ................... | 345/684 |

(Continued)

FOREIGN PATENT DOCUMENTS

| | | | | |
|---|---|---|---|---|
| EP | 0679055 A1 * | 10/1995 | ............. | H04M 3/50 |
| EP | 0684543 A1 * | 11/1995 | ............. | G06F 3/033 |

(Continued)

OTHER PUBLICATIONS

Ahlberg, C. and Shneiderman, B., 1993. The Alphaslider: A rapid and compact selector, Proc. ACM CHI'94 Conference.*

(Continued)

*Primary Examiner* — Eric Wiener
(74) *Attorney, Agent, or Firm* — Timothy Churna; Leonard Smith; Micky Minhas

(57) ABSTRACT

A scroll viewer control that displays associated content having inertial snap points in a scrollable view. The scroll viewer control applies inertial movement to displayed content such that even after a user completes a scroll gesture, the displayed content continues to scroll with reducing velocity until the scroll slows to a stop within the scrollable view. In so doing, the scroll viewer control enforces an inertial snap point by causing the scroll to stop when a boundary of the scrollable view coincides with the inertial snap point. A content control may implements an interface that allows the scroll viewer control to discover the snap point set associated with the content. Furthermore, the content control may notify the scroll viewer control of changes in the snap point set.

20 Claims, 7 Drawing Sheets

(56) References Cited

U.S. PATENT DOCUMENTS

| | | | |
|---|---|---|---|
| 7,415,666 B2 * | 8/2008 | Sellers et al. | 715/251 |
| 7,519,920 B2 * | 4/2009 | Jarrett et al. | 715/785 |
| 8,205,168 B1 * | 6/2012 | Van Slembrouck | 715/786 |
| 8,743,151 B1 * | 6/2014 | Fulcher et al. | 345/684 |
| 8,812,944 B2 * | 8/2014 | Faris et al. | 715/200 |
| 8,842,120 B2 * | 9/2014 | Tijssen | 345/473 |
| 8,935,636 B2 * | 1/2015 | Saito et al. | 715/863 |
| 2001/0011364 A1 * | 8/2001 | Stoub | 717/1 |
| 2004/0194136 A1 * | 9/2004 | Finseth et al. | 725/39 |
| 2004/0208494 A1 * | 10/2004 | Green | 386/125 |
| 2005/0210399 A1 * | 9/2005 | Filner et al. | 715/767 |
| 2006/0136838 A1 * | 6/2006 | Nurmi | 715/786 |
| 2006/0268020 A1 * | 11/2006 | Han | 345/684 |
| 2007/0146337 A1 * | 6/2007 | Ording et al. | 345/173 |
| 2007/0277124 A1 | 11/2007 | Shin et al. | |
| 2008/0155458 A1 * | 6/2008 | Fagans et al. | 715/781 |
| 2008/0267468 A1 * | 10/2008 | Geiger | A61B 8/13 382/128 |
| 2009/0122018 A1 | 5/2009 | Vymenets et al. | |
| 2009/0249252 A1 | 10/2009 | Lundy et al. | |
| 2009/0289779 A1 | 11/2009 | Braun et al. | |
| 2009/0322699 A1 | 12/2009 | Hansson | |
| 2010/0043028 A1 * | 2/2010 | Cormican et al. | 725/52 |
| 2010/0085314 A1 | 4/2010 | Kwok | |
| 2010/0103118 A1 | 4/2010 | Townsend et al. | |
| 2010/0156844 A1 | 6/2010 | Paleczny et al. | |
| 2010/0175023 A1 * | 7/2010 | Gatlin et al. | 715/788 |
| 2011/0072389 A1 * | 3/2011 | Brunner et al. | 715/785 |
| 2011/0074699 A1 * | 3/2011 | Marr et al. | 345/173 |
| 2011/0141142 A1 * | 6/2011 | Leffert | G06F 3/04883 345/659 |
| 2011/0163968 A1 * | 7/2011 | Hogan | 345/173 |
| 2011/0169753 A1 * | 7/2011 | Shimamura | G06F 3/0488 345/173 |
| 2012/0023439 A1 * | 1/2012 | Crim | 715/784 |

FOREIGN PATENT DOCUMENTS

| | | | | |
|---|---|---|---|---|
| EP | 0795811 A1 * | 9/1997 | | G06F 3/033 |
| EP | 0961199 A1 * | 1/1999 | | G06F 3/033 |
| EP | 0994409 A2 * | 4/2000 | | |
| EP | 1058181 A1 * | 12/2000 | | G06F 3/00 |
| EP | 1615109 A2 * | 1/2006 | | |
| EP | 1942401 A1 * | 7/2008 | | |
| WO | WO 9916181 A1 * | 4/1999 | | H04B 1/38 |
| WO | WO 0102949 A1 * | 1/2001 | | |
| WO | WO 0129702 A2 * | 4/2001 | | |
| WO | WO 2004111816 A2 * | 12/2004 | | G06F 3/00 |
| WO | WO 2006020304 A2 * | 2/2006 | | |
| WO | WO 2006020305 A2 * | 2/2006 | | |

OTHER PUBLICATIONS

Wolfgang Hurst, Tobias Lauer, and Georg Götz. Audio-Visual Data Skimming for E-Learning Applications. HCI 2005—Proceedings vol. 2. Institut für Informatik, Albert-Ludwigs-Universität.*

Toshiyuki Masui, Kouichi Kashiwagi, and George R. Borden, IV. 1995. Elastic graphical interfaces to precise data manipulation. In Conference Companion on Human Factors in Computing Systems (CHI '95), I. Katz, R. Mack, and L. Marks (Eds.). ACM, New York, NY, USA, 143-144. DOI=10.1145/223355.223471 http://doi.acm.org/10.1145/223355.223471.*

Wolfgang Hürst and Tobias Lauer and Cedric Barfent and Georg Götz. Forward and Backward Speech Skimming with the Elastic Audio Slider. Proceedings of HCI 2005. 2005.*

Volker Roth and Thea Turner. 2009. Bezel swipe: conflict-free scrolling and multiple selection on mobile touch screen devices. In Proceedings of the SIGCHI Conference on Human Factors in Computing Systems (CHI '09). ACM, New York, NY, USA, 1523-1526. DOI=10.1145/1518701.1518933 http://doi.acm.org/10.1145/1518701.1518933.*

Wolfgang Hürst and Tobias Lauer and Georg Götz. An Elastic Audio Slider for Interactive Speech Skimming. Proceedings of NordCHI '04. 2004. pp. 277-280. ACM Press.*

Wolfgang Hürst, Tobias Lauer, Georg Götz. Interactive Manipulation of Replay Speed While Listening to Speech Recordings. MM'04, Oct. 10-16, 2004, New York, New York, USA. pp. 488-491. 1-58113-893-8/04/0010.*

Jack Yu-Hung Lin and Brad A. Myers. Shortcutter for Pocket PC. Pittsburgh Pebbles PDA Project. Nov. 27, 2009. retrieved from: https://web.archive.org/web/20091127073926/http://www.cs.cmu.edu/~pebbles/v5/shortcutter/windowsce/index.html.*

Dzimitry Aliakseyeu, Pourang Irani, Andrés Lucero, and Sriram Subramanian. 2008. Multi-flick: an evaluation of flick-based scrolling techniques for pen interfaces. In Proceedings of the SIGCHI Conference on Human Factors in Computing Systems (CHI '08). ACM, New York, NY, USA, 1689-1698. DOI=10.1145/1357054.1357319 http://doi.acm.org/10.1145/1357054.*

Dzimitry Aliakseyeu, Pourang Irani, Andrés Lucero, and Sriram Subramanian. Multi-flick: an evaluation of flick-based scrolling techniques for pen interfaces—YouTube. Video uploaded Nov. 30, 2011. retrieved from: https://www.youtube.com/watch?v=Wu8cIraCArc.*

Buxton, et al., "Issues and Techniques in Touch-sensitive Tablet Input", In Proceedings of the 12th Annual Conference on Computer Graphics and Interactive Techniques, vol. 19, Issue 3, Jul. 22-26, 1985, pp. 215-224.

* cited by examiner

EXPOSING INERTIAL SNAP POINTS

BACKGROUND

A user interfaces with an application running on a computing system by interacting with one or more displayed application screens. More specifically, the application screen is populated with one or more visualized elements, some of which perhaps being a control that the user may interact with. One common type of control is a scroll viewer control.

The scroll viewer control provides a view on content, which may be scrolled in the vertical and/or horizontal direction. If the content has greater vertical range than the view permits, the scroll viewer control provides a mechanism for permitting vertical scrolling through the vertical range of the content. Likewise, if the content has greater horizontal range than the view permits, the scroll viewer control provides a mechanism for permitting horizontal scrolling through the horizontal range of the content.

When scrolling, some scroll viewer controls provide an appearance of inertia to the underlying content. Of course, when a user engages in a scroll operation, the content moves. However, the scroll viewer control continues the movement after the user disengages with the scroll operation, rather than stop the movement at the exact moment of disengagement. Thus, the scrolling movement is treated as having momentum such that the velocity of scrolling slows down gradually to a stop.

BRIEF SUMMARY

At least one embodiment described herein relates to a computer-implemented scroll viewer control that is associated with content to be displayed in a scrollable view corresponding to the scroll viewer control. The content has associated therewith a set of one or more inertial snap points. The snap points are content specific such that the snap point set may differ from content to content. The scroll viewer control applies inertial movement to displayed content such that even after a user completes a scroll gesture, the displayed content continues to scroll with reducing velocity until the scroll slows to a stop within the scrollable view. In so doing, the scroll viewer control enforces the inertial snap point by causing the scroll to stop when a boundary of the scrollable view coincides with the inertial snap point. In some embodiments described herein, a content control implements an interface that allows the scroll viewer control to discover the snap point set associated with the content. Furthermore, the content control may notify the scroll viewer control of changes in the snap point set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 9A illustrates a scrollable view in which there are regular horizontal snap points, and irregular vertical snap points;

FIG. 9B illustrates a scrollable view in which there are irregular horizontal snap points, and regular vertical snap points;

FIG. 9C illustrates a scrollable view in which there are regular horizontal snap points, and regular vertical snap points; and FIG. 9D illustrates a scrollable view in which there are irregular horizontal snap points, and irregular vertical snap points.

DETAILED DESCRIPTION

In accordance with embodiments described herein, a computer-implemented scroll viewer control is described. The scroll viewer control is used to display associated content in a scrollable view. The content has associated therewith a set of one or more inertial snap points. The snap points are content specific and content control specific such that the snap point set may differ from content to content, and content control to content control in that different controls may expose different snap points for the same content. The scroll viewer control applies inertial movement to displayed content such that even after a user completes a scroll gesture, the displayed content continues to scroll with reducing velocity until the scroll slows to a stop within the scrollable view. In so doing, the scroll viewer control enforces the inertial snap point by causing the scroll to stop when a boundary of the scrollable view coincides with the inertial snap point.

In some embodiments described herein, a content control implements an interface that allows the scroll viewer control to discover the snap point set associated with the content. Furthermore, the content control may notify the scroll viewer control of changes in the snap point set. First, some introductory discussion regarding computing systems will be described with respect to FIG. 1. Then, the embodiments of the scroll viewer control, content control, and intervening interface will be described with respect to FIGS. 2 through 9.

Figure 1:
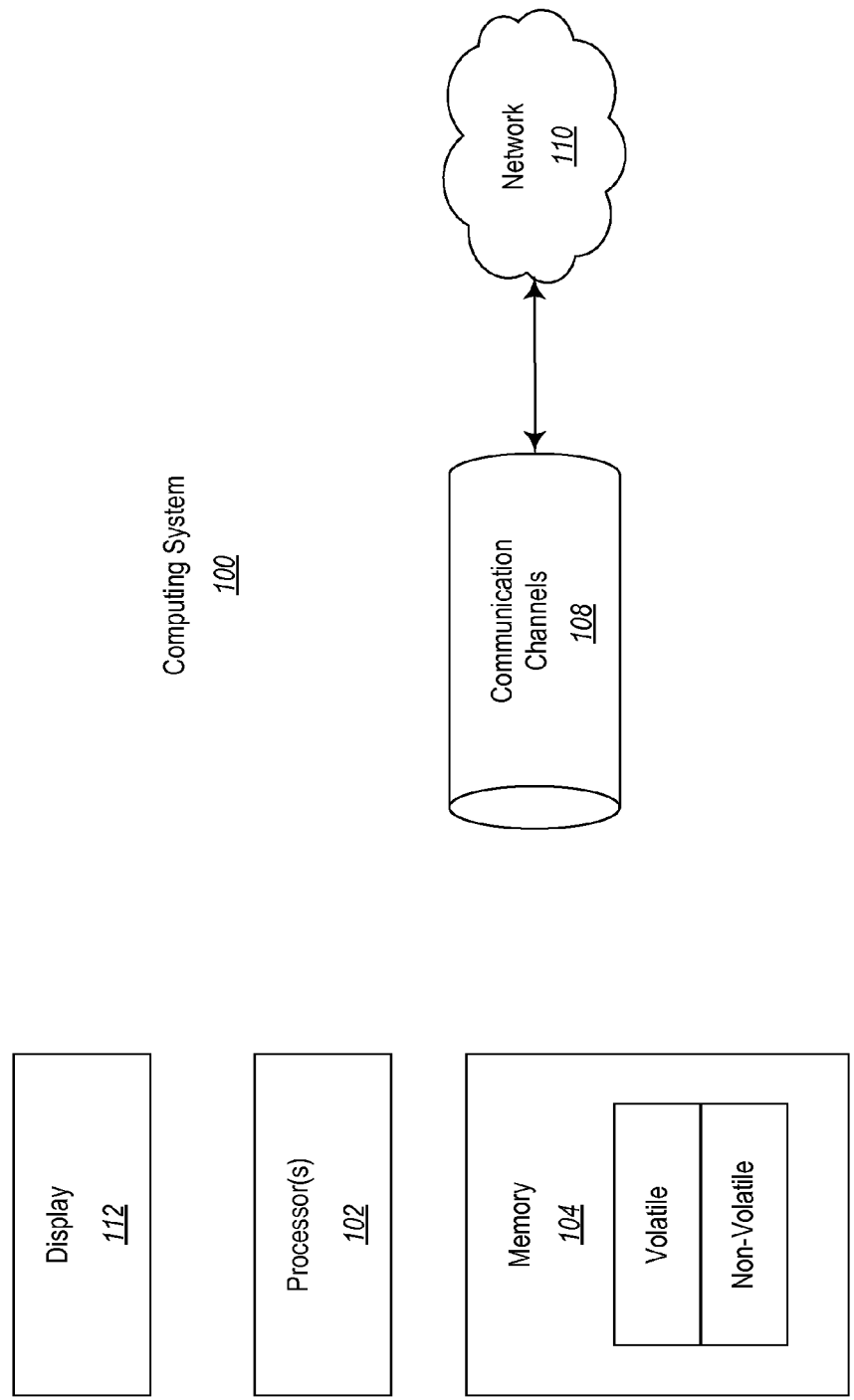
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
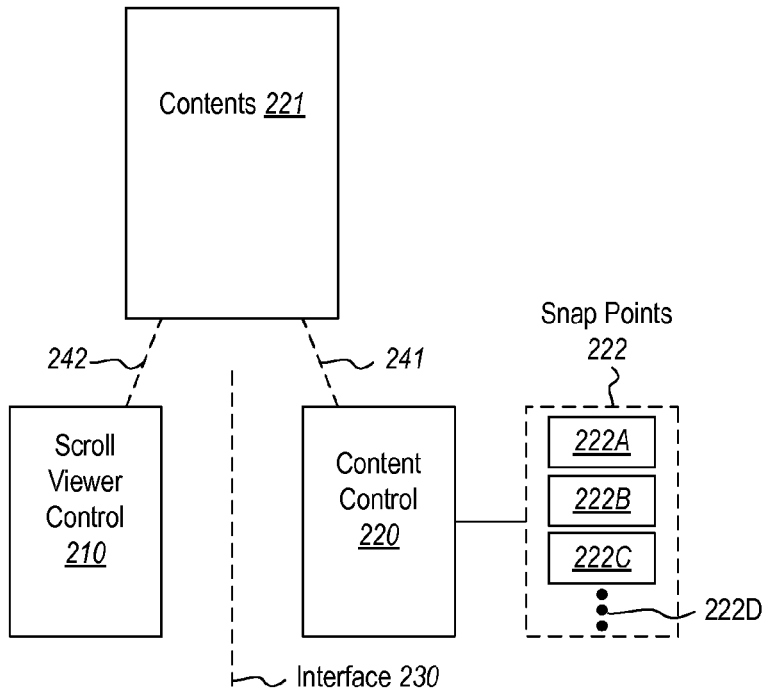
FIG. 2 illustrates an environment that may be implemented by a computer program product operating on the computing system of FIG. 1 and which includes a content control associated with content, and a scroll viewer control interfacing with the content control in order to present the content in a scrollable view.

A computer program product comprising one or more computer storage media having thereon computer-executable instructions that are structured such that, when executed by one or more processors of a computing system, cause the computing system to instantiate in memory the following:

FIG. 2 illustrates an environment 200 that may be implemented by a computer program product operating on the computing system 100 of FIG. 1. In particular, the environment 200 may be created in memory and caused to operate by the processor(s) 102 of the computing system 100 executing computer-executable instructions on one or more computer-readable media of the computer program product.

The environment 200 includes a scroll viewer control 210 that assists in the presentation of content such as content 221. The scroll viewer control 210 causes a portion of the content 221 to be displayed within a scrollable window or view within a display (such as display 112) of a computing system (such as computing system 100).

The scroll viewer control 210 also allows the user to interface with the display to thereby cause the displayed content to scroll (horizontally and/or vertically) within the scrollable view. For instance, the user might interface with a visualization on the display or might otherwise interact with the display through some gesture(s) to cause the scroll operation to occur. Once the user has completed the scroll operation, the scroll control may cause inertia to be applied to the scroll operation. For instance, even after the user has completed the interaction that caused the scroll operation, the scrolling continues albeit with gradually reducing velocity, until the scroll movement comes to a gradual stop.

The content 221 has an associated content control 220 that includes information specific to the content 221. The association between the content control 220 and the content 221 is represented by association element 241. As an example of such information, the content control 220 may have associated inertial snap points 222. There may be any number of inertial snap points. For instance, the inertial snap points 222 are shows as being three distinct snap points 222A, 222B and 222C. However, the ellipses 222D are provided to show greater flexibility in the number of snap points associated with the content 221.

Inertial snap points are used by the scroll viewer control 210 to cause the inertia to be applied in such a way that the scrolling operation stops such that a border of the scrollable view coincides with the inertial snap point. The selection of a particular snap point may be very specific to the content as humans may interpret different snap points as having greater visual appeal depending on the content being displayed. Since different content may have difference inertial snap points, each content may have an associated content control that has a set of inertial snap points that cause desirable inertial snap points to be applied to the content. For instance, an e-mail list might have snap points every five e-mails, or perhaps at a transition from one sender to the next. A calendar in month-view mode might have snap points between each successive month. For a given content, different content controls might pick different snap points. For example, if the content is a set of e-mails, a linear stacking control might select different snap points than a two dimensional grid control. Each type of content control has its own rules for selecting the ideal inertial snap points.

The content control 220 offers up an application program interface 230 to the scroll viewer control 210. Some of the methods offered by the application program interface 230 may, for instance, allow the scroll viewer control 210 to discover the inertial snap points associated with the content 221 so that the scroll viewer control 210 can apply the inertial scrolling with a gradual stop occurring at a designated inertial snap point. Due to the varying nature of the displayed content, the inertial snap points may differ according to content.

In some embodiments, the application program interface 230 may also allow the scroll viewer control 210 to discover whether an inertial snap point is a higher strength inertial snap point (e.g., a mandatory snap point), or a lower strength inertial snap point (an optional snap point). For instance, if the snap points are optional, perhaps they may be ignored if the inertial stop is not to occur within a certain distance from the inertial snap point. On the other hand, if the snap points are mandatory, perhaps the scroll is mandated to stop at a mandatory inertial snap point.

Alternatively or in addition, the inertial snap points may be regular snap points (in which they are equally spaced in the direction of the scroll), or irregular snap points (in which they are not necessarily equally spaced in the direction of the scroll). In this case, if the inertial snap points are regular, the entire set of inertial snap points may be expressed to the scroll viewer control 210 through the application program interface 230 using an initial position of the initial snap point, and a designated spacing between each snap point. If the inertial snap points are irregular, the content control 220 may express each snap point in the entire set (or at least those snap points that are in or close to the position of the displayed content) through the application program interface 230 to the scroll viewer control 210.

The application program interface 230 may also be used to allow the content control 220 to update the scroll viewer control 210 when there has been a change in the inertial snap points and/or when the scroll viewer control 210 is to be provided with additional snap points.

The scroll viewer control 210 may be used to display a wide variety of content. Each content may provide the same application program interface 230 that allows the scroll viewer control 210 to use the same interface contract to discover the inertial snap points associated with the displayed content. Thus, as long as the content control associated with an item of displayed content provides the application program interface 230, the scroll viewer control enforces the appropriate inertial snap points.

The content control 220 may have a list of snap points provided to it. Alternatively or in addition, the content control 220 may have logic that allows for the calculation of some or all of the snap points. The snap points may also vary based on user preferences. For instance, the user, or a component familiar with user preferences, may interface with the content control 220 through the application program interface 230 to allow user preferences to affect the designation of the snap points. For instance, some users may prefer horizontal snap points to be enforced at the right boundary, and other at the left boundary. Some users may prefer vertical snap points to be enforced at the top boundary in some applications, and at the bottom boundary in others. Preferences may also vary by the surrounding circumstances, such as which application is being used. Some users may, for instance, prefer that horizontal snap points be enforced at the right boundary when using a first application, or at the left boundary when using a second application. User preferences may also be applied to identifying snap points. For instance, some users may prefer more frequent snap points. Some users may prefer that there be no mandatory snap points, or all mandatory snap points, and so forth.

Figure 3:
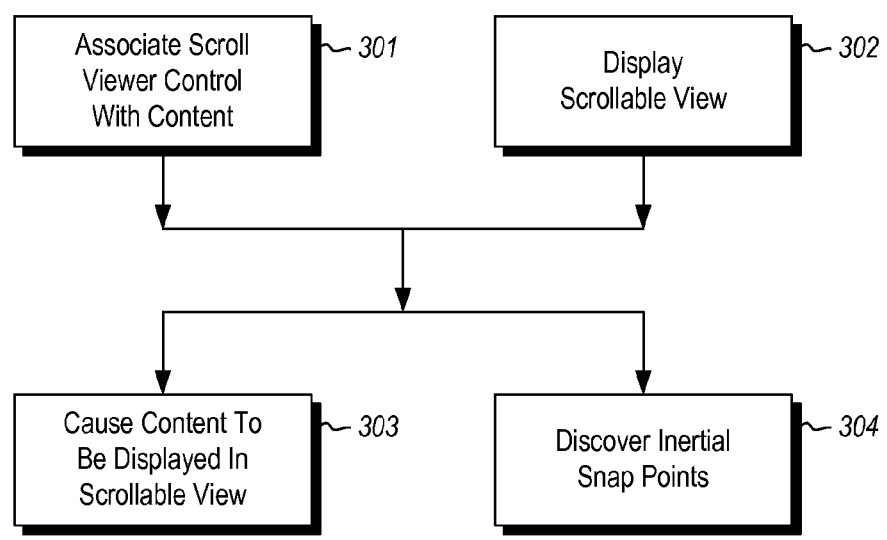
FIG. 3 illustrates a flowchart of a method for a scroll viewer control to display content in a scrollable view.

FIG. 3 illustrates a flowchart of a method 300 for displaying a scrollable view. The method 300 will be described with respect to the environment 200 of FIG. 2. The scroll viewer control is associated with the content (act 301). For instance, the scroll viewer control 210 is associated with the content 221 in FIG. 2. This association is represented with association element 242. In addition, the scrollable view is caused to be displayed by the computing system (act 302). For instance, an unpopulated scrollable view may be displayed within the display 112 of the computing system 100. Acts 301 and 302 are shown in parallel to represent that the invention is not restricted to which act occurs first, or whether the acts are fully or partially occurring simultaneously.

After the scroll viewer control is associated with the content, and after (or perhaps simultaneous with) the display of the scrollable view, content is caused to be displayed within the scrollable view (act 303). If the horizontal range of the content is too large to fit within the scrollable view, the scroll viewer control may permit horizontal scrolling through user gesture with or perhaps without a corresponding visualization. For instance, a horizontal scroll bar may be visualized to permit horizontal scrolling. If the vertical range of the content is too large to fit within the scrollable view, the scroll viewer control may permit vertical scrolling through user gesture with or perhaps without a corresponding visualization. For instance, a vertical scroll bar may be visualized to permit vertical scrolling.

Once the scroll viewer control is associated with the content (act 301), the scroll viewer control may have access to the application program interface offered by the corresponding content control. Referring to FIG. 2, for example, once the scroll viewer control 210 is associated with the content 221, the scroll viewer control 210 may have access to the application program interface 230 offered by the content control 220. From this point, the scroll viewer control 210 may discover a set of one or more inertial snap points associated with the content 221 (act 304). The discovery of the inertial snap points may occur at any time until scrolling inertia that uses the snap points is to be applied to the content (see the method 500 of FIG. 5).

Figure 4:
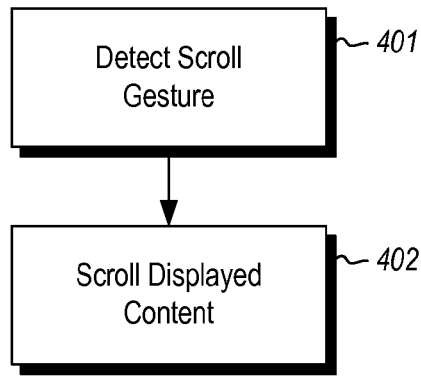
FIG. 4 illustrates a flowchart of a method for responding to the user interfacing with the scrollable view to perform a scrolling gesture.
Figure 5:
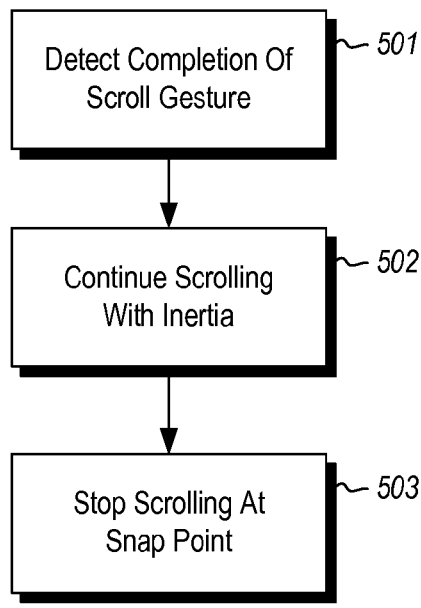
FIG. 5 illustrates a flowchart of a method for the scroll viewer control to apply inertia to the scrolling movement even after the user has completed the user interface that caused the scrolling movement.

FIG. 3 illustrated a method for displaying content within a scrollable view. FIG. 4 illustrates a flowchart of a method 400 for responding to the user interfacing with the scrollable view to perform a scrolling gesture. FIG. 5 illustrates a flowchart of a method 500 for the scroll viewer control to apply inertia to the scrolling movement even after the user has completed the user interface that caused the scrolling movement. First, FIG. 4 will be described.

In FIG. 4, the scroll viewer control detects a scroll gesture (act 401) performed by a user on the scrollable view. The scroll gesture may occur by the user directly touching the display within or outside the boundaries of the scrollable window. Alternatively or in addition, the scroll gesture may occur through the user of other input devices such a mouse. The user interface may involve interface with a visualization or perhaps may involve the recognition of one or more scrolling gestures that do not involve interaction with a visualization. In response to detecting the scroll gesture (act 401), the scroll viewer control causes the displayed content to be scrolled within the scrollable view (act 402).

FIG. 5 illustrates a flowchart of a method 500 for applying inertia to the scroll operation. The scroll viewer control detects that the user has completed the scroll gesture (act 501). In response, the scroll viewer control applies inertial movement to displayed content even after the user has completed the scroll gesture (act 502). This inertial movement occurs such that after a user completes the scroll gesture, the displayed content continues to scroll with reducing velocity until the scroll slows to a stop within the scrollable view. There may perhaps be some oscillation in the direction of movement as the scrolling operation converges on a snap point. As the scrolling operation converges on the snap point, a boundary of the scrollable view stops at the appropriate inertial snap point (act 503) such that the boundary and the snap point coincide. For instance, such a snap point might be the closest snap point to where the inertial movement would have stopped without any inertial snap points. Several example scrollable views will now be explained with respect to FIGS. 6, 7, 8, and 9A through 9D.

In each of these examples, snap points are illustrated in the scrollable view, and content is not illustrated, although in actual usage, the snap points might not be displayed, but the content would be displayed. Furthermore, while some snap points that occur within the field of view are shown in the scrollable views, there will be some snap points that are outside of the field of view, but that may be encountered during scrolling.

Figure 6:
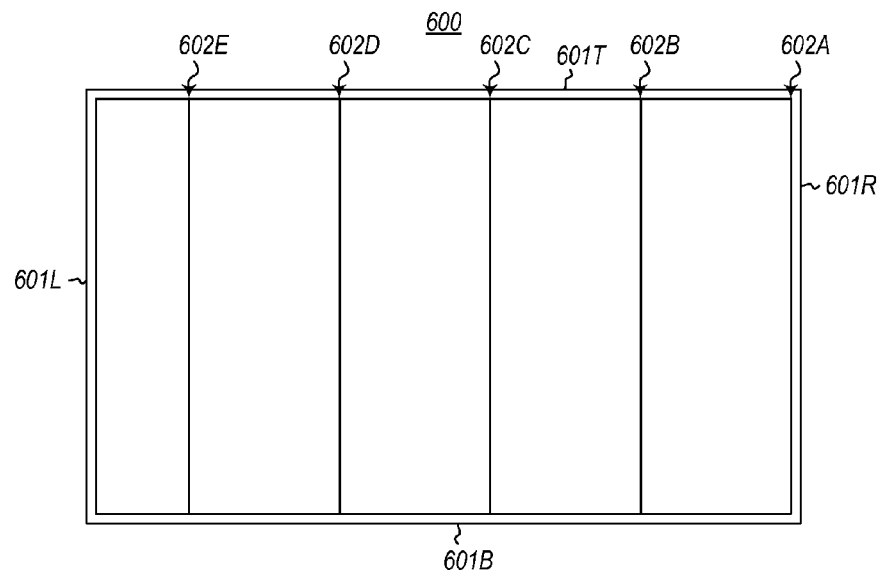
FIG. 6 illustrates a scrollable view in which there are regular horizontal inertial snap points.

FIG. 6 illustrates an example scrollable view 600 that has top boundary 601T, bottom boundary 601B, right boundary 601R, and left boundary 601L. In this case, horizontal scrolling is possible and there are horizontal snap points provided. In this case, after the horizontal scroll is completed, the right boundary 601R of the scrollable view 600 coincides with the horizontal snap point 602A. Note that although the horizontal snap point 602A is shown a vertical line, the horizontal snap point is used when scrolling horizontally, and may be represented by a point on a horizontal range.

The snap points 602A, 602B, 602C, 602D, and 602E are regularly spaced (equally spaced in the horizontal direction of scrolling). Thus, as previously mentioned, a large number of regularly spaced snap points may be represented by a single position of the starting snap points followed by a designated spacing (e.g., 50 pixels). There may be displayed content between each horizontal snap points, but the snap points nevertheless represent logical stopping points. Furthermore, although in FIG. 6, it is the right boundary 601R that coincides with a snapping point at the end of inertial scrolling, the inertial could have instead been applied such that the left boundary 601L coincides with a snap point at the end of the inertial scrolling.

Figure 7:
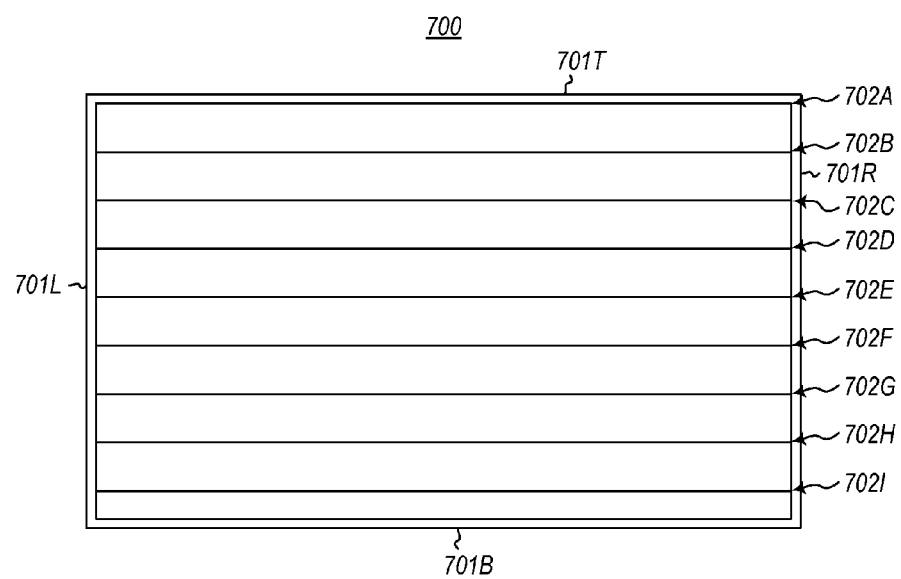
FIG. 7 illustrates a scrollable view in which there are regular vertical inertial snap points.

FIG. 7 illustrates an example scrollable view 700 that has top boundary 701T, bottom boundary 701B, right boundary 701R, and left boundary 701L. In this case, vertical scrolling is possible and there are vertical snap points provided. After the completion of a vertical scroll operation, the top boundary 701T of the scrollable view 700 coincides with the vertical snap point 702A. Note that although the vertical snap point 702A is shown a vertical line, the vertical snap point is used when scrolling vertically, and may be represented by a point on a vertical range.

The snap points 702A through 702I are again regularly spaced (equally spaced in the vertical direction of scrolling). There may be displayed content between each vertical snap point, but the snap points nevertheless represent logical stopping points. Furthermore, although in FIG. 7, it is the top boundary 701T that coincides with a snapping point at the end of inertial scrolling, the inertial could have instead been applied such that the bottom boundary 701B coincides with a snap point at the end of inertial scrolling.

Figure 8:
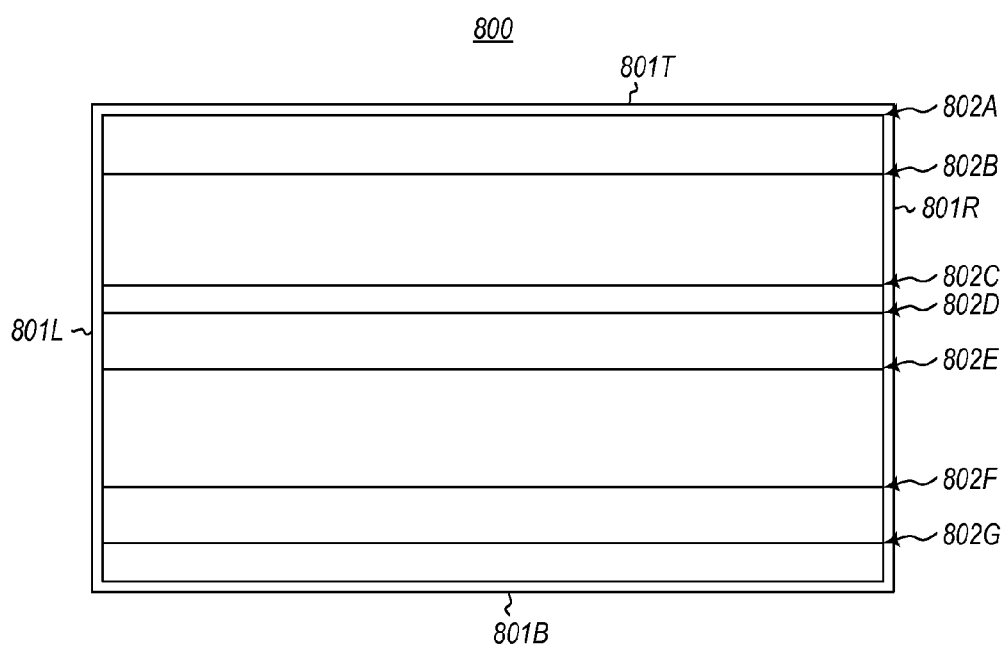
FIG. 8 illustrates a scrollable view in which there are irregular vertical inertial snap points.

FIG. 8 illustrates an example scrollable view 800 that has top boundary 801T, bottom boundary 801B, right boundary 801R, and left boundary 801L. In this case, vertical scrolling is again possible and there are vertical snap points provided. After the completion of a vertical scroll operation, the top boundary 801T of the scrollable view 800 coincides with the vertical snap point 802A. The snap points 802A through 802G are irregularly spaced (not necessarily equally spaced in the vertical direction of scrolling). In the case of irregularly spaced snap points, the snap points may be separately represented by the content control through the application program interface. Again, the inertial could have instead been applied such that the bottom boundary 803B coincides with a snap point at the end of inertial scrolling.

FIGS. 6 through 8 illustrate various scrollable views in which there are snap points in one direction of scrolling. However, there may be snap points in multiple directions of scrolling. For instance, FIGS. 9A through 9D illustrate various scrollable views 900A through 900D in which horizontal and vertical scrolling is possible. Horizontal snap points are applied for horizontal scrolling, and vertical snap points are applied for vertical snap points.

Figures 9A, 9B:
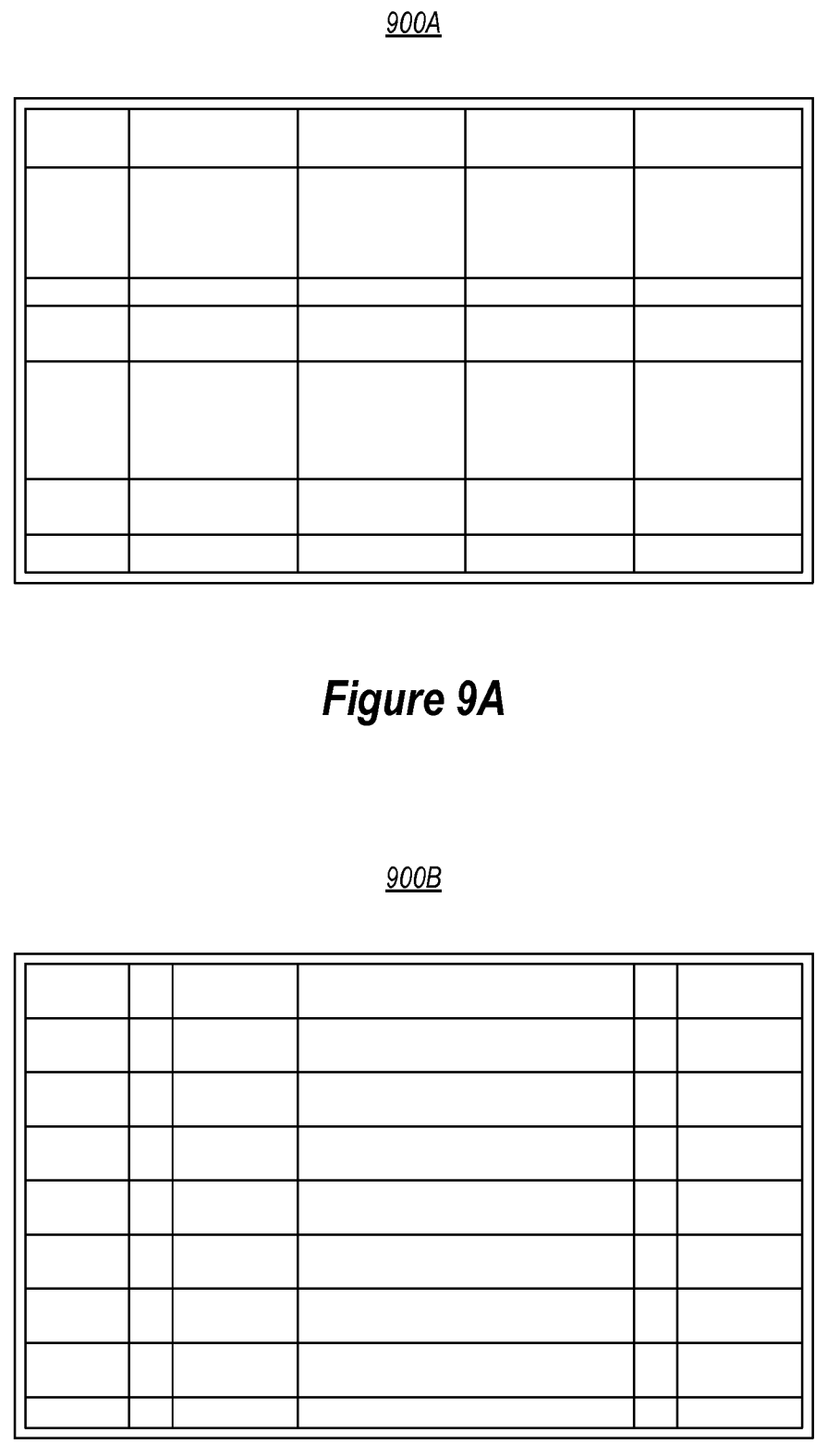

FIG. 9A illustrates a scrollable view 900A in which there are regular horizontal snap points, and irregular vertical snap points. In this case, the right scrollable view boundary is snapped to a regular horizontal snap point in the horizontal direction, whereas the top (or bottom) scrollable view boundary is snapped to an irregular vertical snap point.

FIG. 9B illustrates a scrollable view 900B in which there are irregular horizontal snap points, and regular vertical snap points. In this case, the right (or left) scrollable view boundary is snapped to an irregular horizontal snap point in the horizontal direction, whereas the top scrollable view boundary is snapped to a regular vertical snap point.

Figures 9C, 9D:
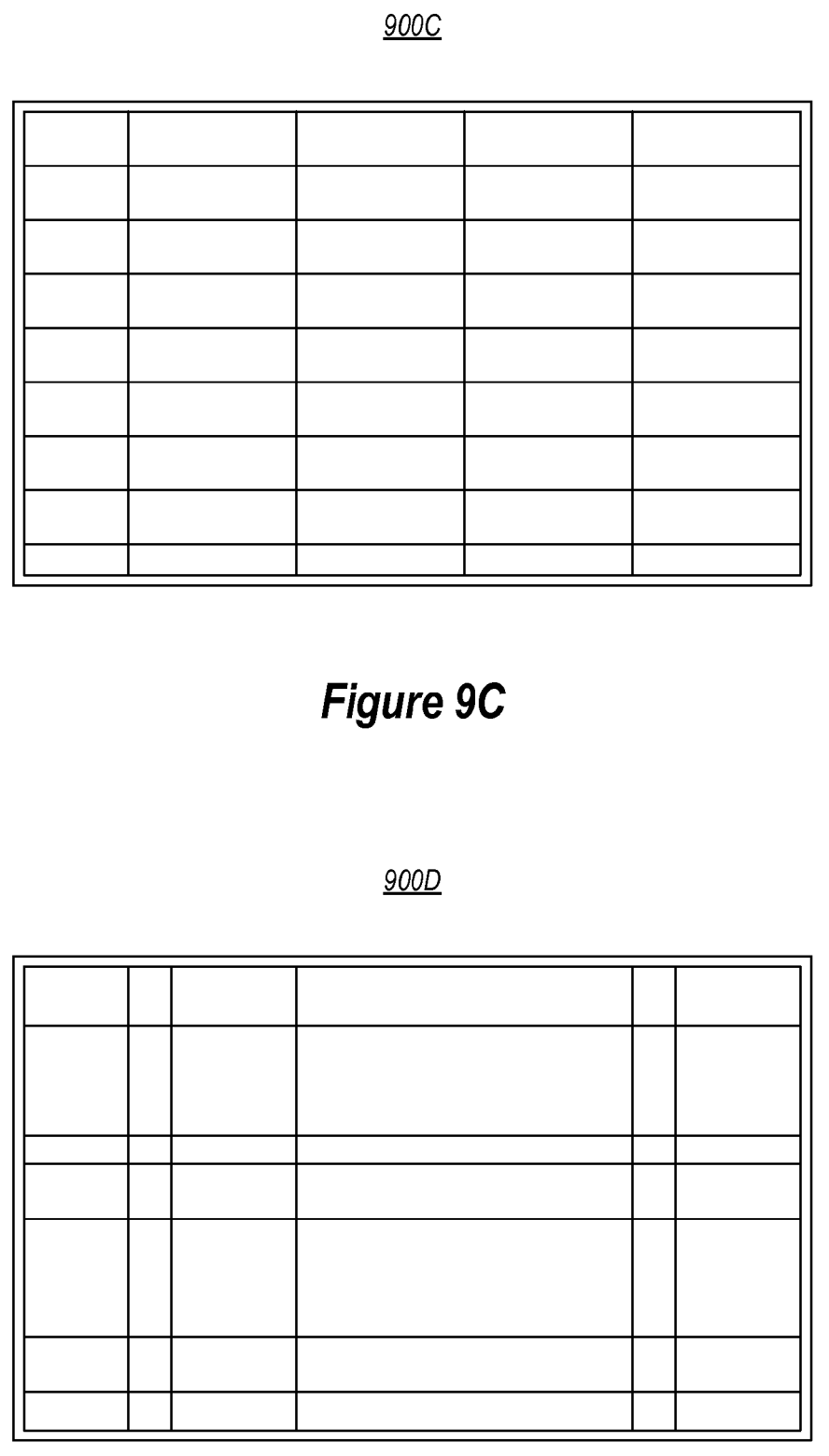

FIG. 9C illustrates a scrollable view 900C in which there are regular horizontal snap points, and regular vertical snap points. In this case, the right scrollable view boundary is snapped to a regular horizontal snap point in the horizontal direction, whereas the top scrollable view boundary is snapped to a regular vertical snap point.

FIG. 9D illustrates a scrollable view 900D in which there are irregular horizontal snap points, and irregular vertical snap points. In this case, the right (or left) scrollable view boundary is snapped to an irregular horizontal snap point in the horizontal direction, whereas the top (or bottom) scrollable view boundary is snapped to an irregular vertical snap point.

Accordingly, the principles describe herein allow a scroll viewer control to interact through a common application program interface with multiple content controls to discover snap points associated with a variety of different types of content. Furthermore, the scroll viewer control may then enforce the snap points as appropriate given the content.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage devices having stored thereon computer-executable instructions that are structured in order to, based on execution by one or more processors of a computing system, cause the computing system to instantiate in memory a scroll viewer control configured, based at least on an association with content, to:
   cause a scrollable view to be displayed on a display of the computing system;
   cause the content to be displayed within the scrollable view;
   cause the displayed content to scroll within the scrollable view based at least on a user interacting with the scrollable view control using a scroll gesture;
   apply inertial movement to displayed content, such that after a user completes the scroll gesture, the displayed content continues to scroll with reducing velocity, passing a boundary of the scrollable view, until the scroll slows to an inertial stop within the scrollable view;
   discover a set of one or more inertial snap points associated with the underlying content, wherein the set of one or more inertial snap points differ according to content;
   distinguish between the set of one or more inertial snap points to identify any mandatory inertial snap points and any optional inertial snap points associated with the content; and
   enforce the set of one or more inertial snap points associated with the underlying content by:
      for any mandatory inertial snap point that is encountered subsequent to the user completing the scroll gesture and during the scroll, mandating the scroll to stop when the mandatory inertial snap point coincides with the boundary of the scrollable view;
      ignoring any optional inertial snap point encountered subsequent to the user completing the scroll gesture and during the scroll that does not occur within a predetermined distance from the boundary of the scrollable view when the scroll slows to the inertial stop; and
      for any optional inertial snap point that is encountered subsequent to the user completing the scroll gesture and during the scroll that occurs within the predetermined distance from the boundary of the scrollable view when the scroll slows to the inertial stop, and that is determined to be a closest inertial snap point to the boundary of the scrollable view when the scroll slows to the inertial stop, causing the boundary of the scrollable view to coincide with said closest inertial snap point.

2. The computer program product in accordance with claim 1, wherein the computer-executable instructions are further structured such that, based on execution by the one or more processors of the computing system, cause the computing system to instantiate in memory the following:
   a content control configured to perform the following when associated with the content:
      notify the scroll viewer control of the set of one or more inertial snap points associated with the content, wherein the set of one or more inertial snap points may differ according to the content control.

3. The computer program product in accordance with claim 2,
   wherein the content control is configured to performing the act of notifying the scroll viewer control of the set of one or more inertial snap points associated with the content by performing an act of implementing an interface comprising one or more methods that may be called by the scroll viewer control,
   wherein the scroll viewer controller is configured to perform the act of discovering the set of one or more inertial snap points by performing an act of calling at least one method of the one or more methods of the interface.

4. The computer program product in accordance with claim 2, wherein the content control is further configured to perform the following when associated with the content:
   notify the scroll viewer control of a change in the set of one or more inertial snap points.

5. The computer program product in accordance with claim 1, wherein the set of one or more inertial snap points includes a horizontal snap point.

6. The computer program product in accordance with claim 1, wherein the set of one or more inertial snap points includes a vertical snap point.

7. The computer program product in accordance with claim 1, wherein the set of one or more inertial snap points includes at least one horizontal snap point and at least one vertical snap point.

8. The computer program product in accordance with claim 1, wherein the set of one or more inertial snap points includes a plurality of regular inertial snap points that are equally spaced.

9. The computer program product in accordance with claim 1, wherein the set of one or more inertial snap points includes a plurality of irregular inertial snap points including at least some that are not equally spaced.

10. The computer program product in accordance with claim 1, wherein the set of one or more inertial snap points includes a plurality of horizontal snap points and a plurality of vertical snap points, wherein
    the plurality of horizontal snap points are regular snap points that are equally spaced horizontally, and
    the plurality of vertical snap points are irregular snap points that includes at least some vertical snap points that are not equally spaced vertically.

11. The computer program product in accordance with claim 1, wherein the set of one or more inertial snap points includes a plurality of horizontal snap points and a plurality of vertical snap points, wherein
    the plurality of vertical snap points are regular snap points that are equally spaced vertically, and
    the plurality of horizontal snap points are irregular snap points that includes at least some horizontal snap points that are not equally spaced horizontally.

12. The computer program product in accordance with claim 1, wherein the boundary of the scrollable view that coincides with the inertial snap point is an upper boundary of the scrollable view.

13. The computer program product in accordance with claim 1, wherein the boundary of the scrollable view that coincides with the inertial snap point is a left boundary of the scrollable view.

14. The computer program product in accordance with claim 1, wherein the set of one or more inertial snap points includes a first inertial snap point and a second inertial snap point, wherein the boundary of the scrollable view that coincides with the first inertial snap point is a first boundary of the scrollable view, wherein the scroll viewer control is configured to perform the following when associated with the content:
    enforce the second inertial snap point of the set of one or more inertial snap points, such that when the scroll slows to the stop, a second boundary of the scrollable view coincides with the second inertial snap point.

15. The computer program product in accordance with claim 14, wherein the first boundary is a vertical boundary and the second boundary is a horizontal boundary.

16. The computer program product in accordance with claim 1, wherein the boundary is configurable by a user.

17. A computer system comprising:
    one or more processors;
    a display; and
    one or more storage devices having thereon computer-executable instructions that are structured in order to, based on execution by the one or more processors, cause the computer system to instantiate the following:
    a scroll viewer control configured to perform the following when associated with content:
        cause a scrollable view to be displayed on a display of the computer system;
        cause the content do be displayed within the scrollable view;
        cause the displayed content to scroll within the scrollable view based at least on a user interacting with the scrollable view control using a scroll gesture;
        apply inertial movement to displayed content such that after a user completes the scroll gesture, the displayed content continues to scroll with reducing velocity, passing a boundary of the scrollable view, until the scroll slows to an inertial stop within the scrollable view;
        discover a plurality inertial snap points associated with the underlying content, wherein the plurality inertial snap points differ according to content;
        distinguish between mandatory inertial snap points and optional inertial snap points associated with the content;
        enforce the set of one or more inertial snap points associated with the underlying content by:
            for any mandatory inertial snap point that is encountered subsequent to the user completing the scroll gesture and during the scroll, mandating the scroll to stop when the mandatory inertial snap point coincides with the boundary of the scrollable view;
            ignoring any optional inertial snap point encountered subsequent to the user completing the scroll gesture and during the scroll that does not occur within a predetermined distance from the boundary of the scrollable view when the scroll slows to the inertial stop; and
            for any optional inertial snap point that is encountered subsequent to the user completing the scroll gesture and during the scroll that occurs within the predetermined distance from the boundary of the scrollable view when the scroll slows to the inertial stop, and that is determined to be a closest inertial snap point to the boundary of the scrollable view when the scroll slows to the inertial stop, causing the boundary of the scrollable view to coincide with said closest inertial snap point.

18. The computer system of claim 17, wherein the computer system applies different inertial snap points to different types of content.

19. The computer system of claim 18, wherein the computer system applies an inertial snap point for calendar content differently than an inertial snap point for email content.

20. A computer-implemented method for allowing a user to scroll through content displayed in a scrollable view on a display, the method comprising:
    an act of causing a scrollable view to be displayed on a display of the computing system;
    an act of causing the content to be displayed within the scrollable view;
    an act causing the displayed content to scroll within the scrollable view based at least on a user interacting with the scrollable view control using a scroll gesture;
    an act of applying inertial movement to displayed content such that after a user completes the scroll gesture, the displayed content continues to scroll with reducing velocity, passing a boundary of the scrollable view, until the scroll slows to an inertial stop within the scrollable view;
    an act of discovering a set of one or more inertial snap points associated with the underlying content, wherein the set of one or more inertial snap points differ according to content;

an act of distinguishing between the set of one or more inertial snap points to identify any mandatory inertial snap points and any optional inertial snap points associated with the content; and an act of enforcing the set of one or more inertial snap points associated with the underlying content by:

for any mandatory inertial snap point that is encountered subsequent to the user completing the scroll gesture and during the scroll, mandating the scroll to stop when the mandatory inertial snap point coincides with the boundary of the scrollable view;

ignoring any optional inertial snap point encountered subsequent to the user completing the scroll gesture and during the scroll that does not occur within a predetermined distance from the boundary of the scrollable view when the scroll slows to the inertial stop; and for any optional inertial snap point that is encountered subsequent to the user completing the scroll gesture and during the scroll that occurs within the predetermined distance from the boundary of the scrollable view when the scroll slows to the inertial stop, and that is determined to be a closest inertial snap point to the boundary of the scrollable view when the scroll slows to the inertial stop, causing the boundary of the scrollable view to coincide with said closest inertial snap point.

* * * * *